Oct. 23, 1923.
P. B. BLOCKER
1,471,586
TIRE CHAIN
Filed Nov. 7, 1921
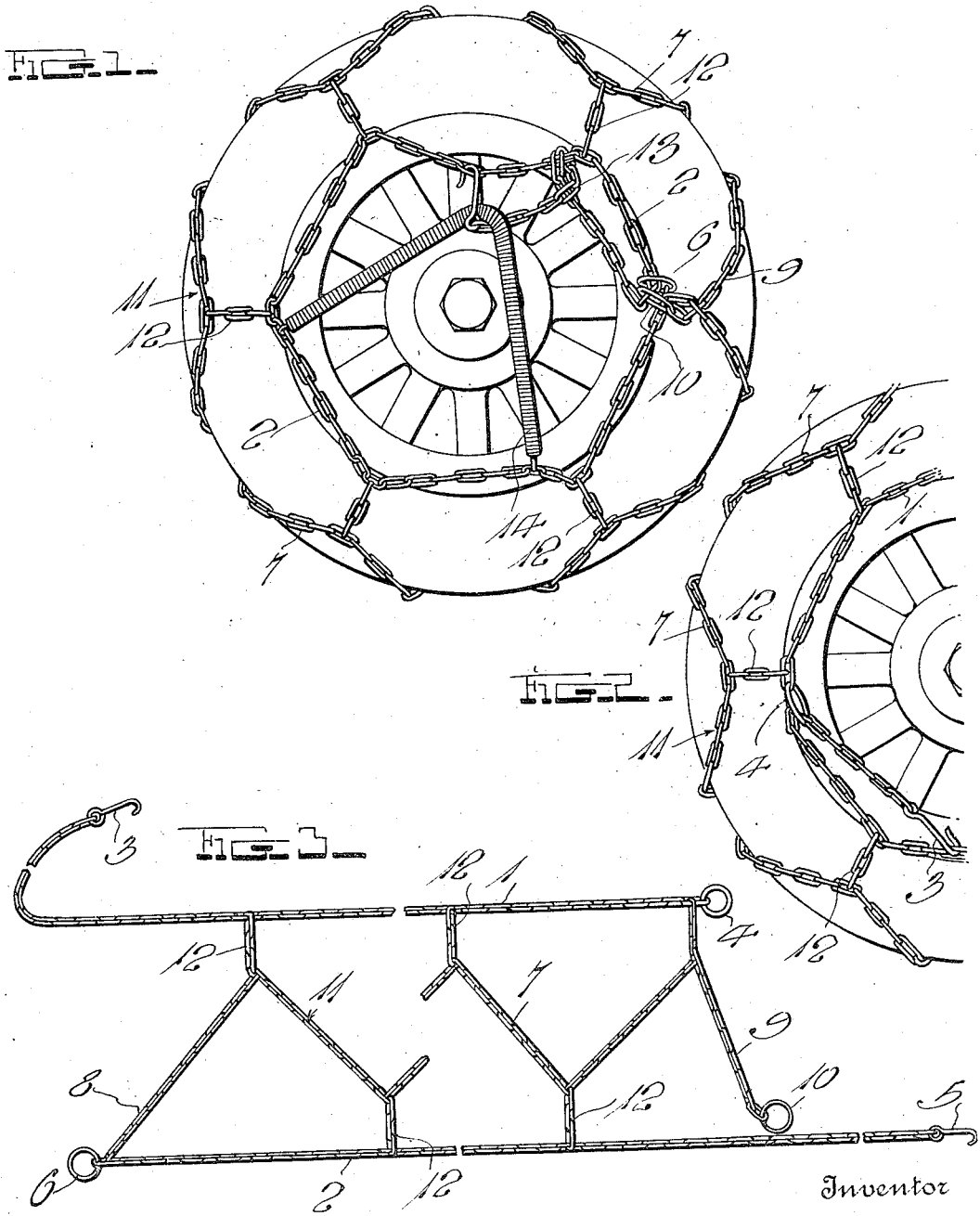
Witness
H. Woodard
Inventor
P. B. Blocker
By H. B. Wilson & co.
Attorneys Patented Oct. 23, 1923.

1,471,586

UNITED STATES PATENT OFFICE.

PRESTON BROOKS BLOCKER, OF SILVER CITY, NEW MEXICO.

TIRE CHAIN.

Application filed November 7, 1921. Serial No. 513,545.

*To all whom it may concern:*

Be it known that I, PRESTON B. BLOCKER, a citizen of the United States, residing at Silver City, in the county of Grant and State of New Mexico, have invented certain new and useful Improvements in Tire Chains; and I do declare the following to be a full, clear, and exact description of the invention, such as will enable others skilled in the art to which it appertains to make and use the same.

My invention relates to improvements in tire chains and more particularly to those of the type employing a pair of side chains for disposition at the inner and outer sides of the tire, and cross linkage between and connected to said side chains, the principal object of the invention being to provide a chain of this general type provided with improved features of construction which permit it to be quickly and easily applied and adapted to tires of different sizes, without the necessity of manipulating any intricate fasteners. This is particularly advantageous when the invention is used in connection with trucks which must be continually run in all weather conditions.

With the foregoing in view, the invention resides in the novel construction and association of parts hereinafter described and claimed, the descriptive matter being supplemented by the accompanying drawings.

Figure 1 is a side elevation of the outer side of a truck wheel and truck tire equipped with my invention.

Figure 2 is a fragmentary elevation of the inner side of the wheel and tire, and the chain attached thereto.

Figure 3 is a plan view of the chain removed from the tire.

In the drawings above briefly described, the numerals 1 and 2 designate a pair of parallel side chains adapted for disposition at the inner and outer sides of a tire and for sake of clearness, I have hereinafter referred to these chains as the "inner" and "outer" side chains. The ends of the inner chain 1 are provided with an ordinary hook 3 and ring 4 respectively, the hook-carrying end being adapted to be inserted through the ring 4, doubled back and hooked into the chain when applying the device to a tire. The ends of the outer chain 2 are provided with a hook 5 and a ring 6 respectively and while said outer chain is fastened in approximately the same manner as the inner chain 1, certain other operations are necessary, as will be hereinafter described.

The side chains 1 and 2 are of equal lengths and are arranged out of transverse registry so that their tie or hook-carrying ends at obliquely opposite corners of the chain unit or segment are longer than the transversely opposite ends.

Cross linkage 7 extends between and is connected with the side chains 1 and 2, one terminal 8 of said cross linkage being connected to the outer side chain 2 at its ring-carrying end as seen clearly in Figs. 1 and 2. The other end of the linkage 7 terminates in a cross chain 9 having a free end located near the hook 5 of the outer side chain 2, said free end of the chain 9 being formed with a ring 10 of sufficient size to receive the chain 2, which is also true of the ring 6.

The linkage 7, except as above specifically described, may be of any desired type including intermediate tread chains having transverse connecting links or tread link elements, but it preferably consists of a zig-zag tread chain 11 connected at intervals with the side chains 1 and 2 by short cross chains 12. By this construction, it is insured that at all times, the tire shall be running upon a portion of the chain so as to give the most effective traction, even on exceptionally icy highways.

When applying the improved chain to a tire, the ends of the inner side chain 1 are first connected with each other by passing the hook-carrying end through the ring 4, drawing the same fairly tight, and engaging the hook with the side chain in the manner shown in Fig. 2. This having been done, the cross chain 9 is passed under the terminal 8 and its ring 10 is alined with the ring 6 of the side chain 2. This having been done, the hook-carrying end of the chain 2 is passed through the eyes 6 and 10 and the hook 5 is hooked into the chain 2 in the manner shown in Fig. 1, the portion of the chain adjacent said hook being preferably given a half hitch 13 around the body portion of said chain before the hooking operation is performed. To prevent accidental detachment of the hook 5 and to hold the tire chain firmly upon the tire, a coiled spring 14 is preferably connected at its ends with the outer side chain 2 in the manner shown in Fig. 1, the hooked end of said chain being passed across the spring and the latter drawn tight before the hook is engaged with the same. The spring 14 draws the entire chain toward the outer side of the wheel and secures the inside hook 3 against disengagement.

From the foregoing, it will be seen that I have provided a very effective chain which may be quickly applied or removed with ease, without the necessity of the driver manipulating any complicated fasteners. Particular attention is laid upon the free end of the cross chain 9 and its ring 10, since without this arrangement, the hook-carrying end of the chain 2 could not be pulled as far through the ring 6 as it can with the present construction, which would often result in a loose chain. By the construction employed, however, the inner side chain need be only adjusted roughly to the size of the tire, and the major adjustment, to draw the chain tightly around the tread of the tire, may be effected by pulling upon the more readily accessible end of the outer chain 2.

Attention may also be directed to the fact that the hook-carrying end of each side chain extends beyond the eye or ring-carrying end of the other chain. Without this arrangement, the joint of one side chain would be circumferentially spaced to an undesirable extent from the joint of the other side chain, when the device is applied to a tire. Furthermore, the arrangement in question is of great advantage when applying the tire chain to the wheel, as the chain may be laid out on the ground in front of the wheel, and the hook-carrying end of one side chain may be passed over the rim and felly of the wheel and engaged with the ring 4 of the other side chain so as to initially connect the chain with the wheel, and then by rotating the wheel, the latter will roll onto the tire chain which may then be secured in place in the proper manner.

Attention is directed to the fact that the tread chain 11 is linked to the side chains 1 and 2 in such a manner that the tread chain cannot move circumferentially with respect to the side chains 1 and 2, and also that the entire chain is not anchored to the spokes of the wheel or to other parts of the wheel, but is left free to creep circumferentially around the tire so as to cause even wearing of the latter.

Since excellent results have been obtained from the exact details disclosed, they are preferably followed, but within the scope of the invention as claimed, numerous minor changes may be made.

I claim:

1. A tire chain comprising inner and outer side chains, means for adjustably connecting the ends of the inner side chain, a hook at one end of the outer side chain and a ring at the other end thereof, cross linkage between and connected to said side chains, said linkage including a terminal connected to said outer side chain at its ring-carrying end and a cross chain terminating in a free end near the hook-carrying end of said outer side chain; said free end of said cross chain being adapted to be passed under said terminal and having a ring for registration with the aforesaid ring; said hook-carrying end of said outer chain extending beyond said cross chain and being adapted to be passed through both of said rings doubled back and hooked into said outer chain.

2. A structure as specified in claim 1, together with a spring device connected with said outer side chain and adapted to be engaged with the hook-carrying end of this chain to remove slack therefrom and prevent accidental unhooking thereof.

3. A tire chain including an outer side chain having a ring on one end and a hook on its other end, the hook-carrying end of said chain being adapted to be passed through said ring doubled back and hooked into said chain; and a coiled spring attached at both of its ends to said side chain between the ends of the latter, the hook-carrying end of the side chain being adapted to be passed across said spring and the latter stretched before hooking said end, whereby to prevent accidental detachment of the hook.

4. A tire chain having side chains each provided with a hook on one end and a ring on the other, the hook-carrying end of each side chain extending beyond the ring-carrying end of the other side chain.

5. An anti-skid segment for vehicle wheels consisting of parallel side chain members and transverse connecting links, the ends of said side chains at obliquely opposite corners of the segment being longer than the ends transversely opposite to provide tie-ends, hooks for the tie-ends, and eyes on the other ends of said side chains.

6. An anti-skid segmental unit for vehicle wheels including parallel side chains of equal length arranged out of transverse registry to provide tie-ends at opposite sides of the unit, hooks carried by the tie-ends, eyes carried by the other ends of the side chains, and tread-link elements connecting the side chains.

7. An anti-skid chain for vehicle wheels consisting of a plurality of segmental units each comprising parallel side chains connected by intermediate tread-chains, and the end of one side chain at the end of each unit being longer than the other to provide a tie-end, a hook carried by the tie-end, and an eye carried by the short end of the opposite side chain, whereby the tie-end of one unit may be threaded through the eye of the adjacent unit while the tie-end of said latter unit may be threaded through the eye of the first mentioned unit.

In testimony whereof I have hereunto set my hand.

PRESTON BROOKS BLOCKER.